United States Patent [19]
Berwanger

[11] Patent Number: 6,016,892
[45] Date of Patent: Jan. 25, 2000

[54] PINLESS INTERNAL AUTOMATIC ADJUSTER FOR BRAKE PISTON

[75] Inventor: Fred William Berwanger, South Bend, Ind.

[73] Assignee: AlliedSignal Inc., Morristown, N.J.

[21] Appl. No.: 08/905,246

[22] Filed: Aug. 1, 1997

[51] Int. Cl.$^7$ ............................. F16D 55/02; F16D 55/18; F16D 65/00
[52] U.S. Cl. ........................ 188/71.8; 188/72.4; 188/73.1
[58] Field of Search ................................ 188/71.8, 196 P, 188/196 R; 192/111 A

[56] References Cited

U.S. PATENT DOCUMENTS

| | | | |
|---|---|---|---|
| 3,729,072 | 4/1973 | Borkowski | 188/71.8 X |
| 4,529,068 | 7/1985 | Gallo | 188/71.8 |
| 4,751,985 | 6/1988 | Chambers | 188/71.8 |
| 5,219,046 | 6/1993 | Clark | 188/71.8 |
| 5,355,774 | 10/1994 | Dittlinger | 92/128 |
| 5,542,504 | 8/1996 | Berwanger | 188/71.8 |

FOREIGN PATENT DOCUMENTS

| | | |
|---|---|---|
| 16 25 763 | 1/1970 | Germany. |
| WO 92 08898 | 5/1992 | WIPO. |

*Primary Examiner*—Chris Schwartz
*Attorney, Agent, or Firm*—Larry J. Palguta

[57] ABSTRACT

An adjustment arrangement or adjuster for a hydraulic brake actuator (5) of the type having a piston (13) which moves a preferred distance within a cylindrical bore (18) in a housing (7) between a quiescent retracted position with a preferred clearance space (25) between one piston end (10) and a brake member (2) of a heat stack (1), and an extended position with the one piston end (10) engaging and actuating the brake member (2) in response to the application of hydraulic fluid pressure, includes a return spring (19) which, upon relief of the hydraulic pressure, urges the piston (13) back from the brake member (1) engaging position to the retracted position. An internally disposed mechanical piston clearance space adjuster includes inner (15) and outer (17) concentric sleeves, the inner one of which establishes a normally fixed anchor location (39) comprising a rim and/or washer (39a) engaging and holding one end of the return spring (19) during spring compression, and an arrangement for moving the anchor location to a new fixed location in response to piston translation exceeding the preferred clearance space (25) thereby changing the quiescent position to which the return spring (19) forces the piston (13) and reestablishing the preferred clearance space (25).

13 Claims, 6 Drawing Sheets

PINLESS INTERNAL AUTOMATIC ADJUSTER FOR BRAKE PISTON

The present invention relates generally to methods and apparatus for adjusting hydraulic brake pistons, for example, to compensate for brake friction surfaces wear, and more especially to an internal automatic adjuster for such brake pistons. The preferred embodiment of the present invention relates to a mechanical brake piston adjuster assembly for aircraft.

It is common knowledge that vehicle braking action over a period of time causes wear of the brake pads or other friction surfaces resulting in a longer stroke of the brake actuator piston to effect braking. At one time this problem was alleviated by periodic manual adjustment of the brake system. Automatic adjusters have largely eliminated the need for such periodic manual adjustments. Some such automatic brake piston adjusters are external to the brake actuator, however, in some applications this is undesirable, for example, due to space considerations.

Another application where such external adjusters may be undesirable is multi-disk brakes employed on some aircraft. External, non-concentric brake piston adjusters in multi-disk brakes are located in the piston housing at positions circumferentially between the pistons, and transmit piston return forces through the first brake disc which is generally referred to as the "pressure plate". The return forces of such adjusters tend to distort the pressure plate, can distort the uniformity of the distribution of brake actuation pressure during braking, and tend to increase heat transfer from the heat sink to the pistons because the pistons are continuously in hard contact with the pressure plate. Prior concentric piston adjusters are located within the pistons and retract the pistons away from the brake heat sink to thereby eliminate the disadvantages of external adjusters. These prior internal piston adjusters are compact and concentric, but rely on a sealed rod or pin running through the piston dome to transmit adjuster forces to the brake housing. Such internal concentric adjusters are anchored to the brake structure by the pin inserted in a sealed gland in the piston dome. During brake actuation, structural deformations and vibrations tend to cause internal adjuster parts to chafe and wear, which often leads to adjuster pin leakage and desultory failures of adjuster components.

Many of the above noted problems are avoided by the patented arrangement entitled EXTERNAL CONCENTRIC AIRCRAFT BRAKE PISTON ADJUSTER granted Aug. 6, 1996 as U.S. Pat. No. 5,542,504. This patented arrangement eliminates the adjuster pin and its associated small parts while maintaining the concentricity and thermal isolation of an internal adjuster. Briefly, in this patented system, external concentric adjuster assembly is located primarily exterior to the piston housing wherein an external compressible resilient arrangement returns the piston to a predetermined running clearance. The arrangement includes a collar member that deforms a deformable member. The external compressible resilient arrangement contributes to the overall bulk of the piston and bushing assembly. U.S. Pat. No. 5,485,902 entitled AIRCRAFT BRAKE PISTON HYDRAULIC ADJUSTER, Jan. 23, 1996, discloses a hydraulic valve that enables an inner piston to be extended, and which also includes an external compressible resilient arrangement.

It is highly desirable to provide a brake piston adjuster assembly which automatically adjusts the return position of the brake piston as the brake friction surfaces of the discs wear. It is also highly desirable to provide a brake piston adjuster assembly which eliminates the adjuster pin and seal. It is further highly desirable to provide a compact, economical adjuster for a brake piston and which does not experience variations in running clearance.

The present invention provides solutions to the above by providing a brake piston adjuster assembly comprising a housing having therein a housing bore, a relatively fixed anchor location at the housing, a piston disposed slidably in the housing bore to be extendible therefrom in response to an application of fluid pressure to one end thereof, a piston return spring having one end biasing the piston and another end engaging the relatively fixed anchor location near the other end of the piston, the spring adapted to compress as the piston is extended from the housing and urging the piston back into the housing upon a reduction of the fluid pressure on the one end of the piston, and means for modifying the anchor location to a new relatively fixed location in response to piston translation exceeding a predetermined distance and thereby changing the location to which the spring returns the piston.

Figure 1:
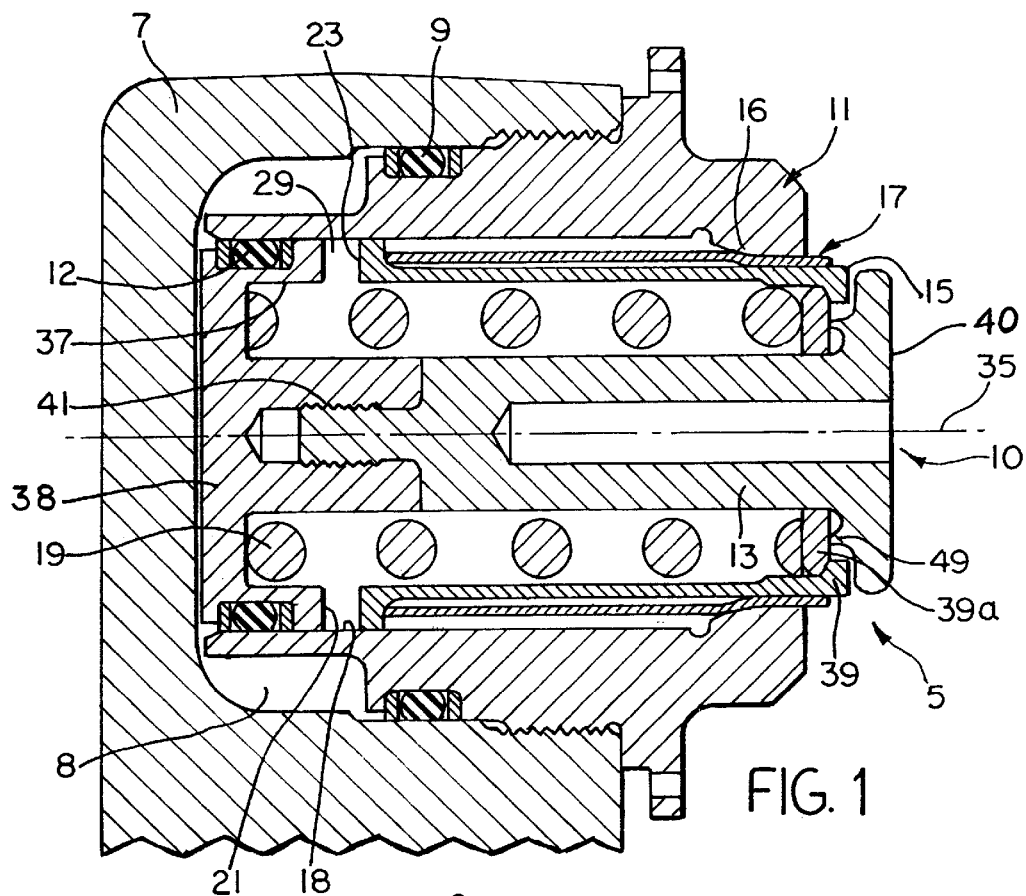
FIG. 1 is a cross-sectional view of a hydraulic brake actuator including a mechanical internal brake piston adjustment mechanism according to one form of the present invention.

It will be understood that while cross-sectional views have been presented most all the brake actuator components are solids of revolution about axis 35 and have cylindrical symmetry.

Corresponding reference characters indicate corresponding parts throughout the several views of the drawings.

In FIG. 1, one brake actuator mechanism 5 is shown threadedly received in a housing 7 and sealed therein by O-ring 9. The actuator mechanism includes a bushing 11, piston 13 with an O-ring seal 12 in bore 18, sleeve 15, a second sleeve or adjuster tube 17 and a return (compression) spring 19 captive between an annular rim 39/washer 39a on the sleeve 15 and an annular pocket 37 near the left end of the piston 13. The piston 13, a cylinder within the housing 7 in which it reciprocates, the adjuster tube 17 and sleeve 15 are all generally concentric members about a common axis 35. During normal brake operation, the rim 39 provides a relatively fixed anchor location for one end of the spring 19. In operation, hydraulic fluid pressure is transmitted to the region 8 and forces the piston toward the right and into engagement with a braking mechanism (brake disc stack, heat sink, etc.) creating normal braking force as shown in FIG. 2. This piston motion also compresses the coil return spring 19 against the stationary sleeve rim 39. When brake pressure is relieved, the spring 19 pushes the piston 13 back to the left to reestablish a running clearance between the piston and heat sink.

Figure 2A:
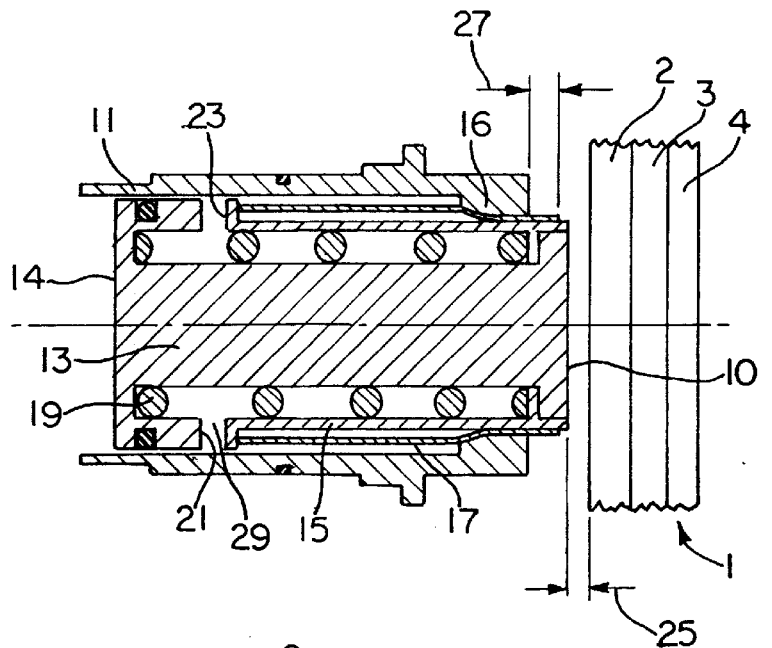
FIGS. 2a–2e are simplified views sequentially illustrating the operation of a brake actuator similar to that of FIG. 1 and including one adjustment incrementation.
Figure 2B:
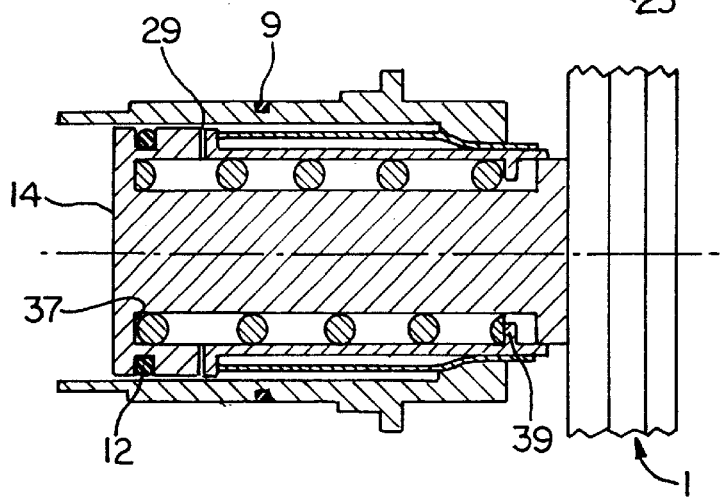

The brake disc stack or heat sink 1 (FIG. 2) is conventional and comprises a plurality of rotors or brake members such as rotor 3 and a plurality of stators or brake members such as pressure plate 2 and stator 4. When quiescent, the hydraulic brake actuator 5 has the right face 10 (sometimes referred to as the piston cover or shank) of piston 13 spaced from pressure plate 2 by a preferred running clearance distance 25 as shown in FIG. 2a. When the brakes are actuated and hydraulic fluid enters chamber 8, pressure on the piston dome 14 forces the piston 13 rightwardly and the face 10 engages the pressure plate 2 applying the commanded braking pressure as illustrated in FIG. 2b. When the brakes are released, the piston 13 is returned by spring 19 to the position of FIG. 2a. During normal operation, there is a gap 29 (FIG. 2a) between surfaces 21 of the piston and rim 23 of the sleeve 15.

Figure 2C:
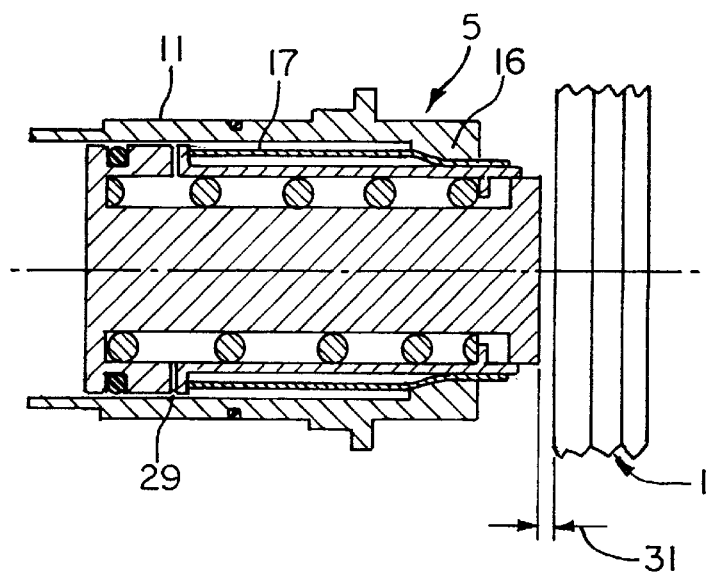
Figure 2D:
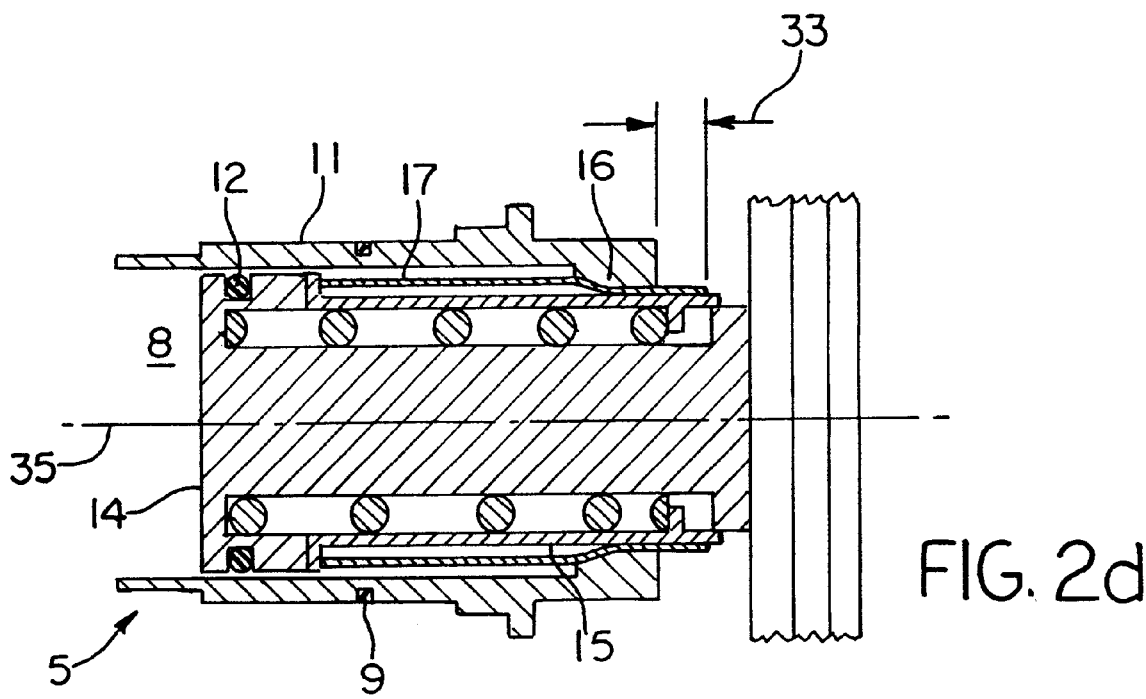
Figure 2E:
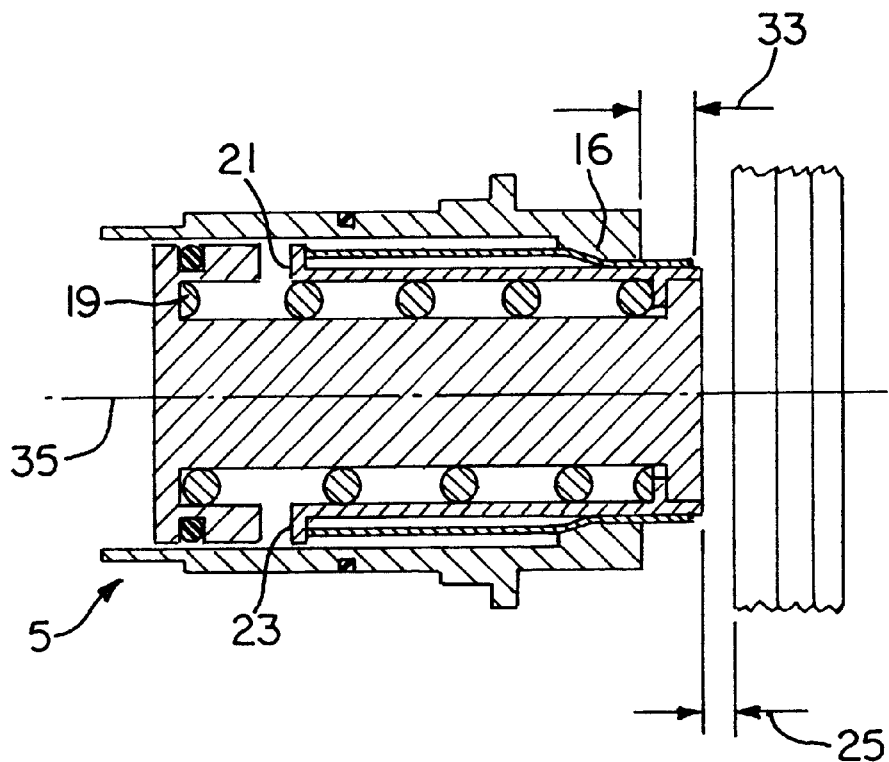

Repeated braking causes wear as shown in FIG. 2c. Here normal travel of piston 13 fails (by an exaggerated amount 31) to engage the pressure plate 2. When this happens, the piston continues its rightward movement closing gap 29 and piston surface 21 engages rim 23 of the sleeve 15. The piston 13, sleeve 15 and adjuster tube 17 continue this rightward motion until piston face 10 engages the pressure plate 2 as shown in FIG. 2d, and braking force is applied. As the piston 13 and sleeve 15 move under the applied hydraulic force, the adjuster tube 17 is forced through the swaging restriction or abutment 16 of bushing 11 and is squeezed down in diameter. As the adjuster tube is forced through the swaging restriction or abutment 16 of the bushing, the tube diameter is "necked down" or reduced and a lesser diameter portion of this outer sleeve or adjuster tube 17 is squeezed securely between the inner sleeve 15 and the swaging restriction 16. The force required to swage the tube 17 is greater than the force required to compress the spring 19 so that when braking force is released, the adjuster tube 17 maintains its new position and the piston is returned by spring 19 to a new rest position as shown in FIG. 2e, but with the same running clearance 25 as it had in FIG. 2a. With this incrementation of adjustment, the length of adjuster tube 17 which extends beyond the bushing 11 has increased from distance 27 in FIG. 2a to the distance 33 in FIGS. 2d and 2e, the quiescent or rest piston position and location of sleeve 15 has moved rightwardly by the difference between the distances 33 and 27, and the quiescent or extended length of the spring 19 is unchanged. Thus, if the piston 13 moves far enough to the right to contact the left end surface 21 of the sleeve 15 and shift it to the right, the adjuster tube 17 is forced through the abutment 16, establishing a new position for the sleeve 15 and tube 17, and adjusting the retracted position of the piston. This, in turn, results in incrementally reestablishing the preferred clearance spacing 25.

Figure 3:
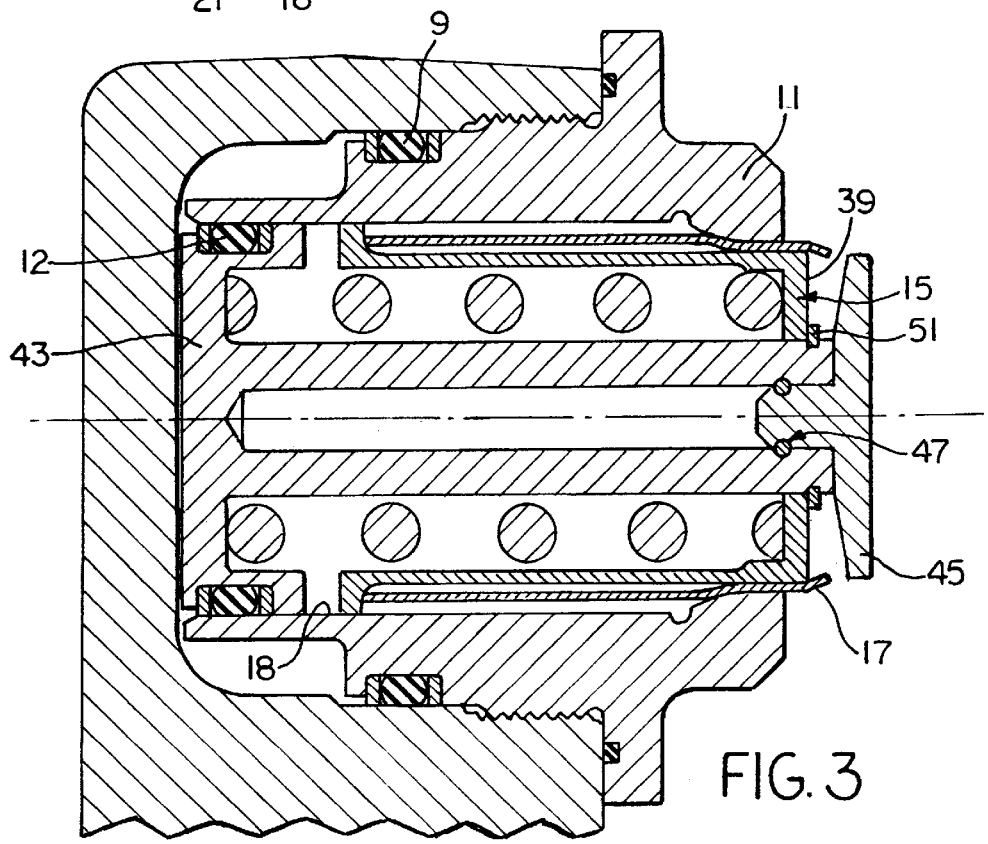
FIG. 3 is a cross-sectional view of a hydraulic brake adjuster similar to that of FIG. 1, but illustrating a modification of the invention.

In FIG. 1, the piston is formed as two halves 38 and 40 joined threadedly together at 41 to facilitate assembly. The piston of FIG. 3 is formed of one member 43 and a piston cap or cover 45 joined by an annular steel wire or snap ring 47. The retracted position of piston 13 in FIG. 1 is determined by the engagement of the piston rim 49 with the outer end of the annular rim 39/washer 39a engaging sleeve 15. The retracted position of piston in FIG. 3 is determined by the engagement of the outer end of the annular rim 39 of the sleeve 15 with the snap ring 51 which rests in a groove of piston portion 43.

Figure 4:
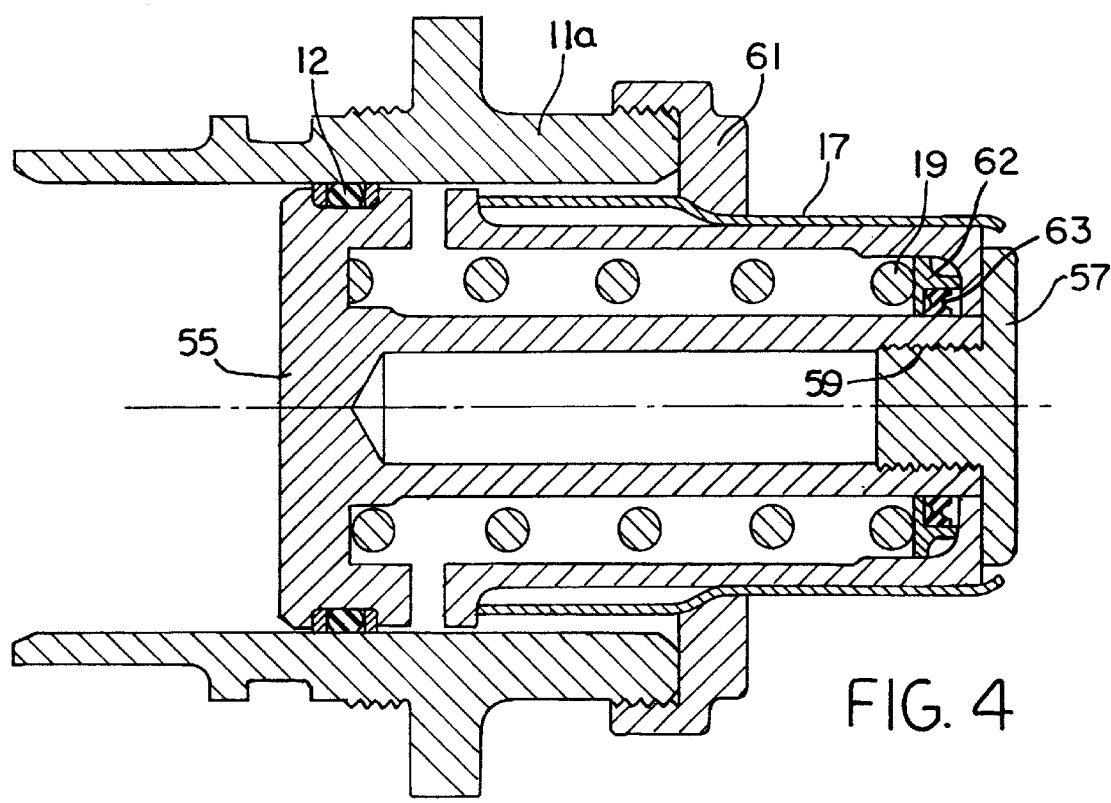
FIG. 4 is a cross-sectional view of a brake adjuster similar to that of FIGS. 1 and 2, but illustrating a further modification of the invention.
Figure 9:
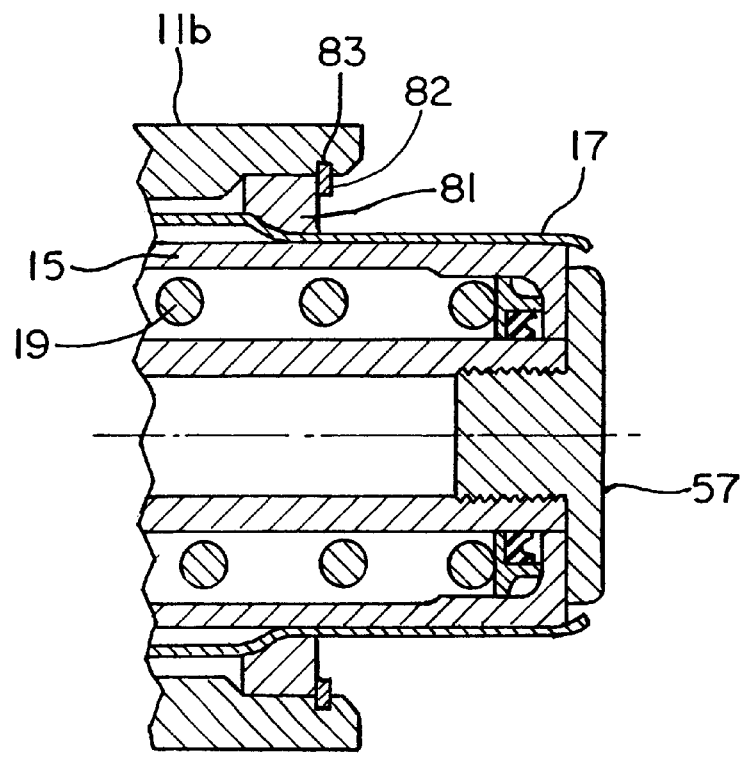
FIG. 9 is a cross-sectional view of an embodiment of a swaging component attached to the bushing.

The piston of FIG. 4 is similarly formed as two portions 55 and 57 joined threadedly at 59. The swaging or abutment of adjuster tube 17 is performed by a stainless steel component 61 threaded onto the aluminum bushing 11a. FIG. 9 illustrates an alternative embodiment for attaching a swaging component 81 by means of a snap ring 82 seated in a groove 83 of bushing 11b. The swaging components 61 and 81 not only permit the use of a harder bearing surface on the swaging geometry, but also permit the replacement of the adjuster tube 17 or other internal components without removing the bushings 11a and 11b from the hydraulic housing 7. Also in FIG. 4, the right end of the spring 19 reacts against a steel component 62 which houses a piston wiper 63 in a split gland, and prevents the spring from bearing directly on the aluminum sleeve 17. Finally in FIG. 4, the threaded piston cover 57 performs the functions of both the cover 45 and snap ring 51 of FIG. 3.

Figure 5:
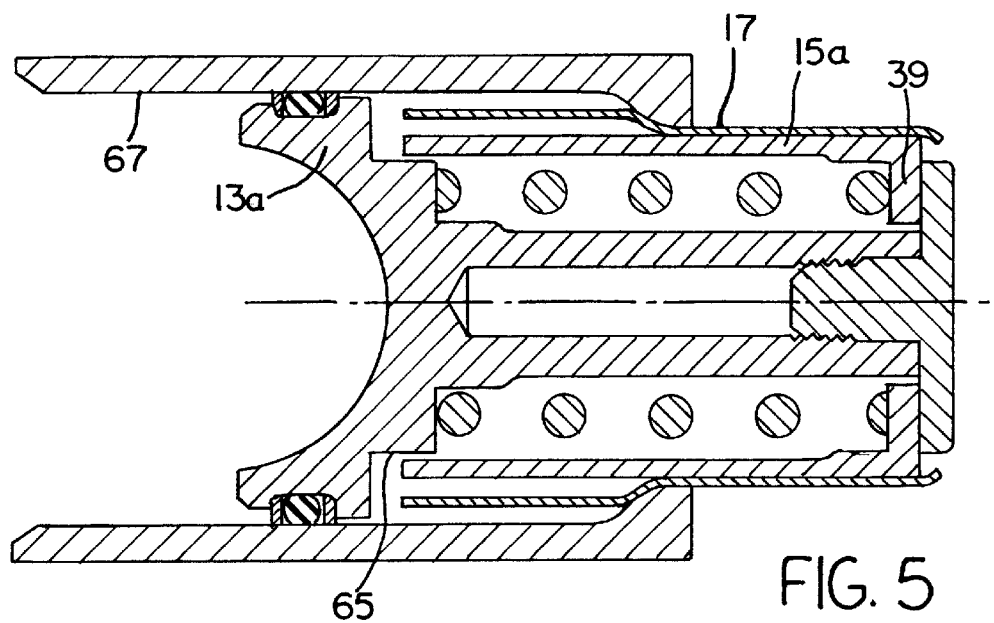
FIG. 5 is a cross-sectional view of a further modification of the brake adjuster.

In FIG. 5, the sleeve 15a pilots on a diameter 65 of piston 13a, rather than the bushing bore 67. This feature allows reduction of the axial length requirement of the adjuster, but causes the friction loads at both ends of the sleeve to be added to the tube 17 swaging load, increasing the variance in tube-adjusting loads. In the other embodiments, only one end of the sleeve 15 carries friction load during piston movement, while the other end of the sleeve is static, except during brake adjustment.

Figure 6:
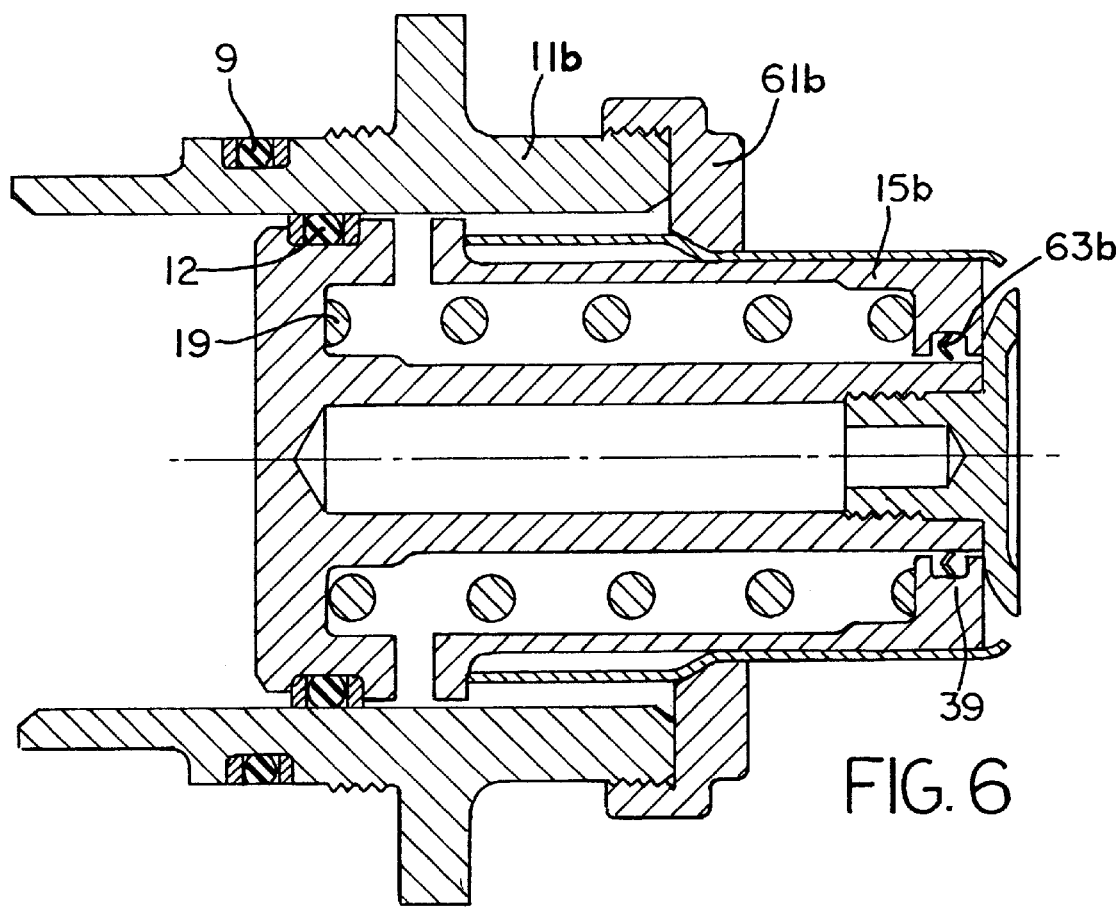
FIG. 6 is a cross-sectional view of yet another modification of the brake adjuster.

The embodiment of FIG. 6 is most similar to that of FIG. 4 and differs therefrom in that the piston wiper 63b is housed in a one-piece gland in the sleeve 15b inner diameter. Such a wiper performs a dirt exclusion function, but may not be required since the adjuster tube 17 conforms tightly to the swaging geometry, and the minimal gap between the sleeve 15b and piston shank is remote from hydraulic sealing surfaces.

Figure 7:
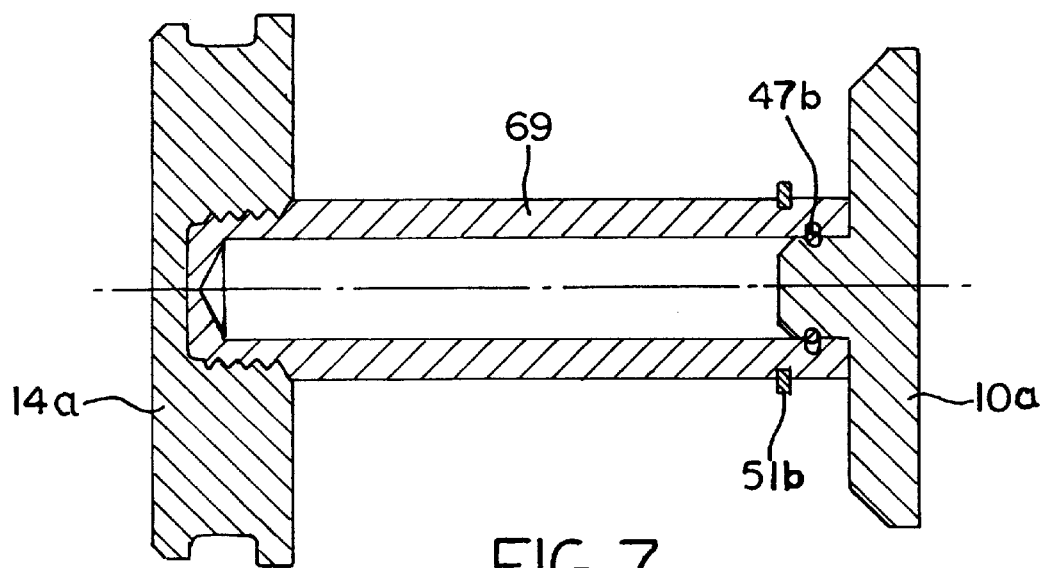
FIG. 7 is a cross-sectional view of a modified piston suitable for use in the brake adjuster.
Figure 8:
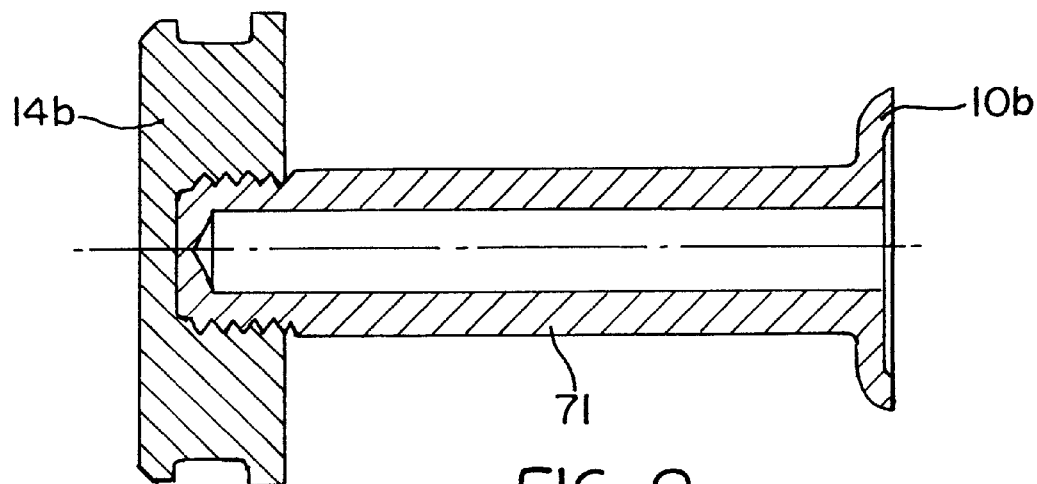
FIG. 8 is a cross-sectional view of a piston similar to that of FIG. 1.

FIGS. 7 and 8 show piston assembly embodiments which reduce weight and heat transfer by utilizing different materials for the piston head and shank. For example, the shank portions 69 and 71 may be hollow and formed of a high-strength, low-conductivity material such as titanium. The ends 14a and 14b which are exposed to the hydraulic fluid may be made of a low density material such as aluminum to reduce piston weight. The piston face which engages the pressure plate 2 is preferably of a low thermal conductivity material. In FIG. 8, this face 10b is the same material as the shank 71 (same as in FIG. 1 for piston half 40) while in FIG. 7 a different material may be used since the face portion 10a is a separate part joined, as was described in conjunction with FIG. 3, by a wire or snap ring 47b.

What is claimed is:

1. A hydraulic brake actuator of the type having a piston translatable within a cylindrical bore in a housing between a quiescent retracted position with a preferred clearance space between one piston end and a brake member, and an extended position with said piston end engaging and actuating the brake member in response to the application of hydraulic fluid pressure; the actuator comprising a return spring operable upon relief of the hydraulic fluid pressure to urge the piston back from the brake member engaging position to the retracted position, and an internally disposed mechanical piston clearance space adjuster comprising:

normally fixed anchor means for engaging and holding one end of the return spring during spring deformation;

means for moving the anchor means to a new fixed location in response to piston translation exceeding the preferred clearance space thereby changing the quiescent position to which the return spring forces the piston and reestablishing the preferred clearance space;

the anchor means comprising inner and outer concentric sleeves, the inner sleeve having a first rim biased by said one end of the return spring and a second rim for engaging one end of the outer sleeve, the piston located coaxially within the inner sleeve, the return spring located coaxially with the piston and intermediate the piston and inner sleeve, the piston, return spring, and inner and outer sleeves all located coaxially within the cylindrical bore, and the outer sleeve compressable by the adjuster during movement of the outer sleeve toward the new fixed location.

2. The actuator of claim 1, wherein the first rim extends radially inwardly from the inner sleeve and the second rim extends radially outwardly from the inner sleeve.

3. The actuator of claim 2, wherein the outer sleeve comprises two cylindrical portions of dissimilar diameters interconnected by a transition region and the housing includes a swaging restriction juxtaposed with the transition region and through which a lesser diameter portion of the outer sleeve passes.

4. The actuator of claim 3, wherein a part of the lesser diameter portion of the outer sleeve is squeezed securely between the inner sleeve and the swaging restriction.

5. The actuator of claim 4, wherein the means for moving comprises an annular portion of the piston and the second rim of the inner sleeve, the piston annular portion engaging the second rim and forcing the outer sleeve axially relative to the swaging restriction thereby reducing the diameter of a portion of the outer sleeve in the area of the transition region so that the inner and outer sleeves move to an adjusted axial position and the sleeves are frictionally held at the adjusted axial position.

6. The actuator of claim 1, wherein the inner sleeve has the first rim extending radially inwardly from the inner sleeve near one end thereof and engaging said spring one end, the outer sleeve comprises two cylindrical portions of dissimilar diameters interconnected by a transition region and the housing including a swaging restriction juxtaposed with the transition region and through which a lesser diameter portion of the outer sleeve passes, and the means for moving comprises a portion of the piston engaging and forcing the outer sleeve axially relative to the swaging restriction thereby reducing the diameter of a portion of the outer sleeve in the area of the transition region so that the inner and outer sleeves move to an adjusted axial position.

7. The actuator of claim 6, wherein a sealing member is located between the inner sleeve and the piston.

8. A brake piston adjuster assembly comprising a housing having therein a housing bore, a relatively fixed anchor location at the housing, a piston disposed slidably in the housing bore to be extendible therefrom in response to an application of fluid pressure to one end thereof, a piston return spring having one end biasing the piston and another end engaging the relatively fixed anchor location near the other end of the piston, the spring adapted to compress as the piston is extended from the housing and urging the piston back into the housing upon a reduction of the fluid pressure on the one end of the piston, and means for modifying the anchor location to a new relatively fixed location in response to piston translation exceeding a predetermined distance and thereby changing a location to which the spring returns the piston, the anchor location comprising inner and outer concentric sleeves, the inner sleeve having a rim near one end thereof extending radially inwardly from the inner sleeve and biased by said one end of the spring, the piston located coaxially within the inner sleeve, the return spring located coaxially with the piston and intermediate the piston and inner sleeve, the piston, return spring and inner and outer sleeves all located coaxially within the housing bore, and the outer sleeve reducible in diameter by the adjuster during movement of the outer sleeve toward the new relatively fixed location.

9. The adjuster assembly of claim 8, wherein the outer sleeve comprises two cylindrical portions of dissimilar diameters interconnected by a transition region and the housing includes a swaging restriction juxtaposed with the transition region and through which a lesser diameter portion of the outer sleeve passes.

10. The adjuster assembly of claim 9, wherein a part of the lesser diameter portion of the outer sleeve is squeezed between the inner sleeve and the swaging restriction.

11. The adjuster assembly of claim 10, wherein the inner sleeve further includes a second rim extending radially outwardly from the inner sleeve and the means for modifying comprises an annular portion of the piston and the second rim of the sleeve, the piston annular portion engaging the second rim and forcing the outer sleeve axially relative to the swaging restriction to thereby reduce the diameter of a portion of the outer sleeve so that the inner and outer sleeves move to an adjusted axial position and the sleeves are frictionally held at the adjusted axial position.

12. The adjuster assembly of claim 10, wherein the means for modifying comprises an annular portion of the piston engaging and forcing the outer sleeve axially relative to the swaging restriction thereby reducing the diameter of a portion of the outer sleeve near the transition region so that the inner and outer sleeves move to an adjusted position and the sleeves are held at the adjusted position.

13. The adjuster assembly of claim 8, wherein the piston comprises two piston portions joined threadedly together.

* * * * *